March 8, 1960 W. T. BROWNELL 2,927,749
AIRFOIL WING ROOT FILLET
Filed Nov. 2, 1956 2 Sheets-Sheet 2
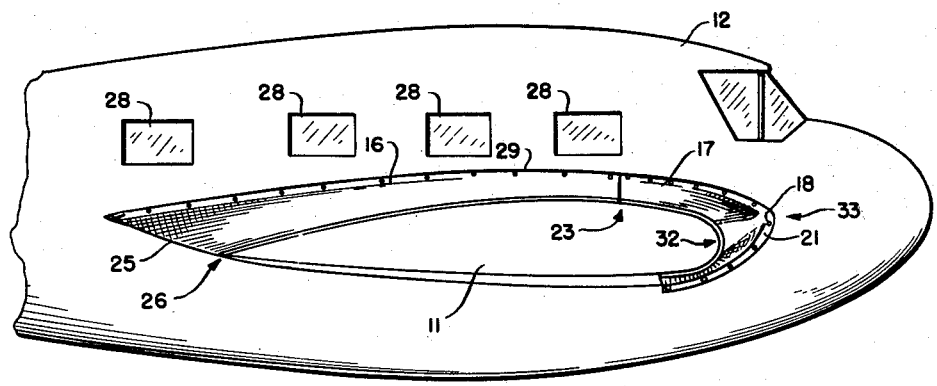
FIG. 3
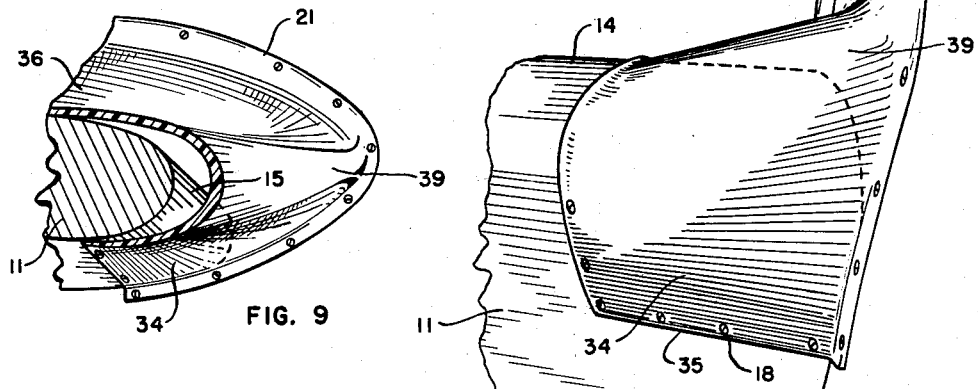
FIG. 9
FIG. 4
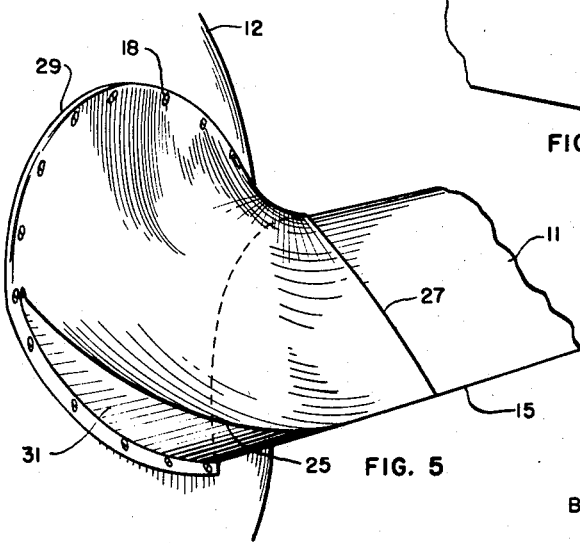
FIG. 5
INVENTOR
WALTER T. BROWNELL
BY
ATTORNEYS United States Patent Office 2,927,749
Patented Mar. 8, 1960

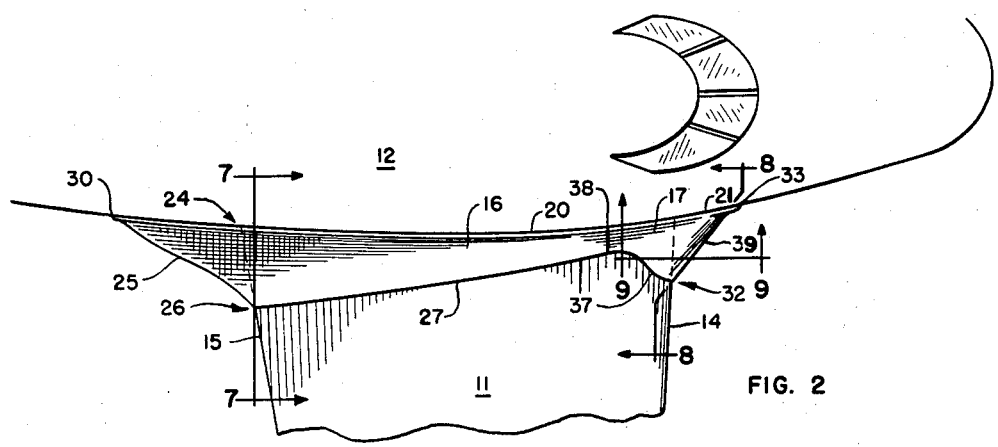
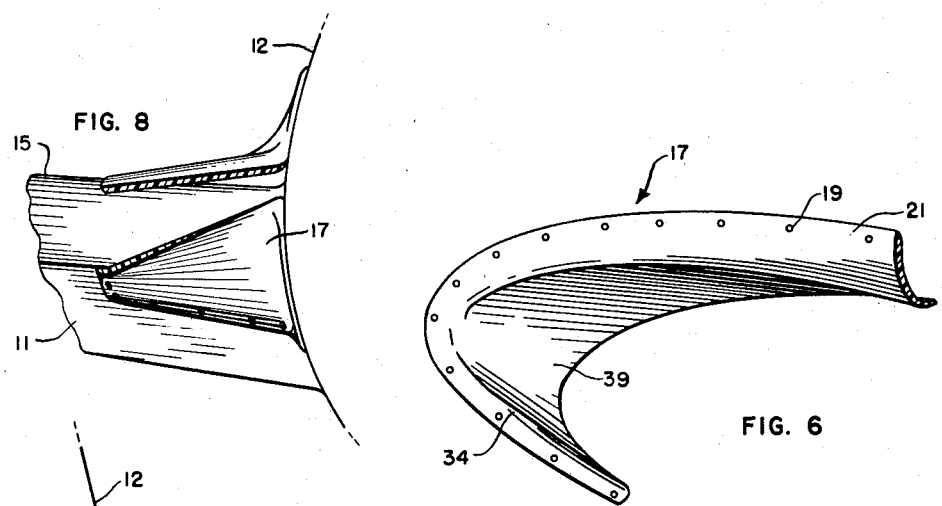
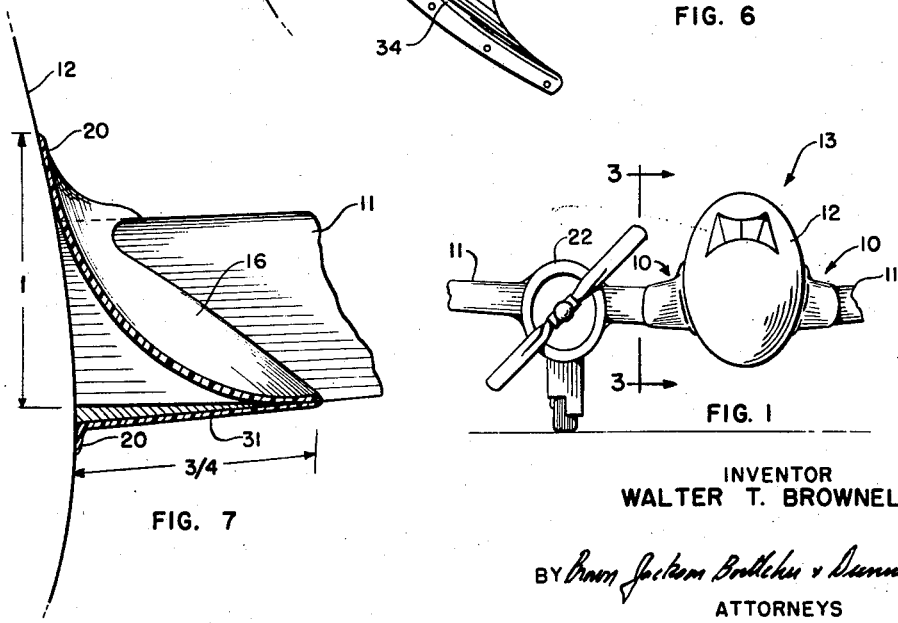
INVENTOR
WALTER T. BROWNELL

2,927,749

AIRFOIL WING ROOT FILLET

Walter T. Brownell, Mount Prospect, Ill.

Application November 2, 1956, Serial No. 619,976

13 Claims. (Cl. 244—45)

This invention relates to airfoils and more particularly to new and improved wing structures and/or wing-fuselage fillets which are for the purpose of reducing interference drag particularly along the root of the wing.

A principal object of the invention is to provide an aircraft with means for smoothing out the air flow adjacent the root of the wing at low and medium angles of attack of the aircraft in flight so as to increase its cruising speeds at low power and at high altitudes.

An unexpected feature and/or advantage of the invention was the improvement in single engine performance of a two-engine plane as when one engine quits in flight, thus contributing greatly to an improved safety factor in flying. Therefore, a further important object of the invention is to provide means for improving the general stability and stall characteristics of an airplane.

Another object of the invention is to provide means whereby interference drag along with wing lift disturbances at cruising and climb angles of attack of an aircraft might be minimized.

A further object of the invention is to redesign the leading edge of the wing adjacent the fuselage so as to reduce the tendency for the aircraft to "fall off the step" at high altitudes or at low powers.

A further object of the invention is to bring the leading edge of the wing adjacent the fuselage forward along an angle extending upwardly as well as forwardly of the original leading edge of the wing and at the same time gradually reducing the radius of said leading edge in the direction of the fuselage of the aircraft so as to minimize the resistance of the wing to the air flowing thereover and also, at the same time, directing more air over the root of the wing adjacent the fuselage so as to aid, or compensate for, the slip stream from the propeller blast that normally cleans up the wing-fuselage disturbances.

A further object of the invention is to extend both the leading and trailing edges of the wing adjacent the fuselage and simultaneously merge the wing with the fuselage along an arc so that the angle therebetween or junction is substantially greater than 90°.

A further object of the invention is to provide a fairing at the wing root, which, in cross section, will have a generally elliptical shape in which the longer radius part of the curve merges with the fuselage surface and the smaller radius part of said curve merges with the wing surface.

A further object of the invention is to provide such a fairing between the fuselage and wing which will comprise approximately one quarter of an ellipse, the curve developed having its position of tangency to the wing out from the fuselage approximately three quarters of the distance of the vertical contact point on the fuselage above the wing.

A further object of the invention is to extend such an elliptically curved fairing beyond the trailing edge of the wing.

A further object of the invention is to provide wing fillets for an aircraft which extend beyond the leading edge of the wing and have a curved shape in section which progressively decreases in radius from a maximum at the high point of the airfoil section to a minimum at the leading edge of the fillet and which leading edge also progressively decreases in radius in the direction of the fuselage.

A further object of the invention is to redesign the leading edge of the wing of an aircraft so that adjacent the fuselage it progressively decreases in radius in the direction of the fuselage and fairs along a large angle in to the fuselage.

Supplementary thereto, it is also an object to fair the top surface of the wing immediately behind said new leading edge into the fuselage along a curvature which progressively decreases to a minimum radius of curvature at said juncture of the leading edge of the wing with the fuselage.

A further object of the invention is to provide a wing fillet for an aircraft in which the top surface thereof has a substantially elliptical shape which from adjacent the thickest portion of the airfoil section at the root of the wing progressively decreases toward the leading edge of the wing and progressively increases toward the trailing edge of the wing.

Many other advantages as well as objects and features of the invention will be or will become apparent from the description of the invention which follow, and it will be understood that said description of the invention is not to be taken in a limiting sense, since it is contemplated that the wing construction and/or wing fillet may in principle be adapted for many if not all types of aircraft. Further, it is to be understood that many changes and/or modifications of the invention may be made within the spirit of the invention as defined in the claims attached hereto.

Referring to the drawings:

Figure 1 is a fragmented front view of a low winged dual-motor aircraft having a pair of wing-fuselage fillets thereon in accordance with the present invention;

Figure 2 is a fragmented top view of one of said fillets and adjacent portions of the wing and fuselage with which it is shown assembled;

Figure 3 is a fragmented side view of the aircraft taken through a section of the wing along lines 3—3 of Figure 1 looking in the direction indicated by the arrows;

Figure 4 is a fragmented front view showing the leading edge of the fillet in relation to the leading edge of the wing;

Figure 5 is a fragmented rear view showing the trailing edge of the fillet in relation to the trailing edge of the wing;

Figure 6 is a view of the forward part of one of the fillets detached from the aircraft and looking into the same;

Figure 7 is a sectional view taken along lines 7—7 in Figure 2 looking in the direction indicated by the arrows;

Figure 8 is a sectional view taken along lines 8—8 of Figure 2 looking in the direction indicated by the arrows; and Figure 9 is a fragmented view of the forward side of the fillet with a portion thereof cut away to show the relation of the leading edge of the fillet to the leading edge of the wing where they meet the fuselage.

Now referring more particularly to the several views wherein like parts are identified by like reference numerals, 10 indicates a pair of wing-fuselage fairings or fillets covering the joinder of the top surface of wings 11 with the fuselage 12 of a low winged dual motor airplane 13, as illustrated in Figure 1. For convenience and ease in assembling the fillets 10 over the leading edge 14 and trailing edge 15 of the wings 11 said fillets are preferably formed in two sections 16 and 17. Once assembled on the wings and against the fuselage 12 they are held in place by screws or the like 18 which are extended through openings 19 provided therefor in flanges 20 and 21 of said fillet sections 16 and 17 and with their heads flush with the surface of the fillet. Although the fillet sections 16 and 17 may be formed of any suitable light weight but strong and durable material I prefer to mold them from fiber glass to the shape to be hereinafter described.

In a low winged dual motor plane such as illustrated in Figure 1 of which the Lockheed Lodestar is an example one of the characteristics of the aircraft is the acute angle inclination of its wings 11 with respect to the fuselage 12 as well as the progressive thickening of the leading edge of the wing as it approaches the fuselage. In an aircraft such as referred to, the profile of the leading edge of the wings near the fuselage will approach that of a circle having a radius of roughly 6 to 8 inches. These design factors have been found to cause the aircraft to have extreme interference drag along with lift disturbances at cruising and climb angles of attack. Moreover in flying with one engine dead, considerable roll tendency and rudder load has been experienced. Apparently because of the proximity of the motors 22 to the fuselage 12 and their alignment with the leading edge 14 of the wing 11 slip stream from the propeller tended to clean up much of the wing-fuselage disturbances otherwise present. However, when one motor is cut off, the disturbances reappear, creating an unbalance in the lifting power between the wings and which may be an important contributory cause of accidents due to engine failure on take off or so soon thereafter that the plane has not gained sufficient altitude to give the pilot time to regain control.

I, however, have found that by relocating and reducing the profile of the leading edge of the wing adjacent the fuselage as well as fairing out the joinder of the wing with the fuselage to get rid of the acute angle, I could greatly improve the performance of the aircraft. By providing a fillet which would thus fair the wing surface into the fuselage at a larger angle and provide a new leading edge which was angled not only forwardly to increase the angle at which the wing meets the fuselage but also by raising the leading edge higher than that of the wing to be more nearly perpendicular to the fuselage and also progressively decreasing in profile, the resultant redistribution as well as increased and smoother flow of air over the top of the wing gained for the aircraft not only lifting power at both cruising and climb angles of attack, thereby increasing the cruising speed of the aircraft as much as 8 m.p.h. at 650 H.P. and 10,000 feet altitude, but also provided a startling and unexpected improvement in single engine performance. The roll tendency previously experienced, as discussed above, practically disappeared and the rudder load was greatly reduced, thus reducing considerably the chance of an accident on take off or at low altitudes.

Referring to Figures 2 and 3 the rear section 16 of a fillet according to the present invention preferably extends from the high point 23 of the wing where it is joined with a forward fillet section 17 rearwardly along the fuselage 12 to beyond 24, where the trailing edge 15 of the wing 11 meets the fuselage and defines a new trailing edge which angles forwardly and outwardly to merge with the trailing edge 15 of the wing 11 at a point 26. The exposed upper surface of said fillet section 16 is developed as one quarter of an ellipse which progressively increases in the direction of the trailing edge 15 of the wing. The elliptical curve can be pictured by imagining that an ellipse with its longest diameter vertical were pushed against the side of the fuselage 12, while its smaller diameter arc sits on the wing 11. The curve as thus developed has its position or line of tangency to the wing spaced out from the fuselage a distance approximately three quarters of the distance its line of tangency with the fuselage is above the wing. See Figure 7.

Although other means of arriving at the desired fairing curve to get rid of the acute angle joinder of the wing with the fuselage may be utilized, preferably a line of tangency 27 is selected which is roughly in a plane substantially perpendicular to the axis of the wing. Because of the rearward receding of the fuselage from the high point of the wing (best seen in Figure 2) and the curved shape of the airfoil section (Figure 3), the size of the ellipse progressively increasse rearwardly. As a practical matter, to avoid obstructing the windows 28 in the cabin of the aircraft, a tangency line 27 was selected which was roughly six inches out from the fuselage 12 at the high point 23 of the airfoil section and the elliptical curve was developed using the one to three quarter radius mentioned above. Thus, for example, at the high point 23 of the wing where fillet section 16 joins the forward fillet section 17, line 27 is six inches out from the fuselage while tangency line 29 on the fuselage is eight inches above the wing. These dimensions progressively increase as lines 27 and 29 are extended rearwardly, although the same three quarter to one ratio is maintained.

In order to clean up the sharp angle with which the trailing edge 15 of the wing meets the fuselage 12 as at 24, the fillet section 16 is extended along the fuselage 12 beyond said trailing edge 15 to a point 30 sufficiently to the rear of point 24 as to permit trailing edge 25 of the fillet section 16 to define a rather shallow curve or sweep which blends both into the surface of the fuselage 12 and trailing edge 15 of the wing. By thus shifting from an acute to an obtuse angle, eddy currents and other air disturbances in this area will be considerably reduced. To complete the fillet section 16 it is provided with an under portion 31 which, as seen in Figure 5, constitutes an extension of the underside of the wing beyond its trailing edge 15 and is preferably curved upwardly as a continuation of the curved shape given the undersurface of the wing. The elliptical fairing curve is of course maintained out to point 30, although, obviously, because of the curved shape of the trailing edge 25, its curvature is progressively clipped. Nevertheless the curved shape is predicated on an extension of tangency line 27 beyond the edge 15 of the wing, maintaining the 3/4:1 ratio. The distance separating points 24 and 30 may be considerably varied in accordance with where tangency line 27 intersects the trailing edge 15 of the wing and how obtuse an angle or shallow curve is desired for the trailing edge 25 of the fillet. Various other factors may also be determinative of the distance separating 24 and 30, as for example, the amount of available space along the fuselage, interference with the cabin door, etc. The important thing is, as discussed above, to remove or smooth out the relatively sharp angle at which the trailing edge of the wing otherwise meets the fuselage.

In developing the leading edge 39 of the forward fillet section 17, a point 32 is selected on the leading edge 14 of the wing out from the fuselage a distance equal to roughly 10 to 30% of the root wing chord and a point 33 on the fuselage forwardly of the leading edge 14 of the wing a distance equal to roughly 5 to 15% of the wing chord, said second point 33 being so spaced above the leading edge of the wing as to assume a more nearly perpendicular relation to the fuselage surface. Whereas the leading edge of the wing at said point 32 may be defined as having an arcuate shape equal to a portion of a circle having a 6 to 8 inch radius, such circular shape of the leading edge 39 of the fillet is progressively decreased in size to one of a radius of two inches or less adjacent the fuselage 12. The lower under side 34 of the fillet section 17 behind its leading edge 39 is carried rearwardly and provided with an attaching flange 35 by which it attached to the underside of the wing 11, through screws 18, immediately behind its leading edge 14, providing a smooth uninterrupted curvature into the leading edge 39. In shaping the top side 36 (Figure 9) of the forward fillet section 17, a line 37 is developed which begins at the outer end 32 of the leading edge of the fillet and curves inwardly to meet the outer side of the rear fillet section 16 at tangency line 27, and an extension of the wing surface paralleling the inclination given the fillet's leading edge 39 is constructed in the area defined by the fuselage 12, said leading edge 31 of the fillet, boundary line 37 and boundary 38 where the rear fillet section 16 meets the forward fillet section 17, said constructed surface being given a curved shape in section which roughly approximates a 30° declination from the high point 23 of the wing to the leading edge 31 of the fillet. Upon this is constructed a continuation of tangency line 27 and a fairing curve developed therefrom as a continuation of the upper surface of fillet section 16 using the 3/4:1 ratio as previously discussed to blend said surface into the fuselage 12 along a wide angle. Desirably the elliptical fairing curve which is thus developed progressively decreases to near zero where it meets with the leading edge 39 of the fillet. Theoretically, the leading edge of the fillet should also be at or near zero at this junction although as a practical matter this is not absolutely necessary. Thus the upper surface of the forward fillet section 17 behind its leading edge 39 will have a curved shape which is partly an extension of the curvature of the top surface of the wing and partly an extension of the elliptical fairing curvature of the rear fillet section 16 which fairs the wing surface into the surface of the fuselage 12.

Although the invention has thus far been described as particularly useful when comprising a wing-fuselage fairing or fillet applied to a low winged dual aircraft having its wings substantially centered, or at least intermediately disposed betwen the top and lower surface of the fuselage, such a fillet will also have advantages by way of improving single engine performance and increased cruising speed through more accurate control and distribution of air flow over the wing at the fuselage when applied to other low winged dual motor aircraft. Thus for example, it will also be useful in aircraft wherein the fuselage is set on or in the wings, although in such instances some modification of the fairing curves may be necessary to avoid acute angles either of the leading edge or where the wing meets the fuselage. Thus it may be necessary to reangle or reshape tangency line 27 or even to use a ratio other than 3/4:1. Also, the leading edge of the wing in some instances may extend beneath the fuselage and additional fairing of the fillet may be necessary to assure a smooth blending of the new leading edge into the underside of the wing and adjacent surface of the fuselage to avoid and/or remove acute angles which tend to disturb or interrupt air flow with resultant reduction of speed and lift power of the wings. Even in single engine aircraft, it will be seen possible to use the invention in smoothing out the air flow and correcting the same to gain cruising speed and air lift. Furthermore, it should be appreciated that such fillets can be formed in more than two sections or differently divided. Furthermore the wings of an airplane might be themselves reshaped at the root to acquire the desired fairing into the fuselage and inclination of leading edge without resort to a fillet built thereupon.

Thus it will be apparent that all of the objects and advantages of the invention have been demonstrated as obtainable in a convenient, simple and practical manner.

Having thus described my invention, I claim:

1. An airfoil construction for an aircraft having a fuselage and a pair of wings extending outwardly therefrom, said construction comprising a fairing member secured over the joinder of the top surface of each wing with the fuselage of said aircraft, which fairing member extends forwardly of the leading edge of the wing thence turning downwardly and rearwardly merging with the under surface of the wing immediately behind its leading edge, said fairing member having its opposed sides substantially merging with the adjacent surface of the wing and fuselage, the portion of said fairing extending along the top surface of the wing constituting a generally arcuate surface of concave shape in transverse section, and the portion of the fairing member extending forwardly of the leading edge of the wing presenting a round leading edge portion which is angled forwardly from the leading edge of the wing, and in an upward direction, toward the fuselage.

2. An airfoil construction according to claim 1 in which the arcuate shaped surface of the fairing member extending along the top surface of the wing progressively shortens in radius in the direction of the forward rounded leading edge portion thereof.

3. An airfoil construction according to claim 1, in which the upwardly and forwardly angled rounded forward leading edge portion of said fairing member progressively decreases in radius from approximately that of the leading edge of the wing adjacent its joinder therewith to a minimum radius adjacent its joinder with the fuselage.

4. An airfoil construction for an aircraft having a fuselage and a pair of wings extending outwardly therefrom, wherein a portion of the leading edge of said wings of the aircraft adjacent its fuselage is angled forwardly and upwardly toward the fuselage at a greater degree than the remainder of said leading edge, and said portion having a curved shape in section which progressively decreases in radius in the direction of the fuselage.

5. An airfoil construction according to claim 4 wherein the top surface of the wings is blended into the adjacent surface of the fuselage along an arc.

6. An airfoil construction according to claim 4 wherein the top surface of the wing is blended into the adjacent surface of the fuselage along elliptical arcs the locus of the foci of which extends transversely of the axis of the wing, and the radii of which arcs are progressively decreasing in the direction of the leading edge of the wings.

7. An airfoil construction according to claim 4 wherein said wings have the portion of their trailing edge adjacent the fuselage curving rearwardly to blend into the surface of the fuselage.

8. For use with an aircraft having a fuselage and a pair of wings joined to opposite sides of the fuselage, a wing-fuselage fairing adapted to cover the joinder of the top surface of one of the wings with the fuselage and having a part to project forwardly at the leading edge of and terminate in a portion which meets with the under surface of the wing immediately behind the leading edge of said wing, said fairing presenting a rounded forward edge which is substantially flush with the leading edge of the wing at the side of the fairing remote from the fuselage and which is angled upwardly with relation to said leading edge and curves forwardly thereof toward the fuselage, said forward edge of the fairing having a rounded profile progressively decreasing in radius so as to have a sharper rounded edge adjacent the fuselage which blends in a shallow arc into the side surface of the fuselage, the upper surface of said fairing, along its length, having a concave arcuate shape in transverse section which merges along one edge into the top surface of the wing and along its other edge into the adjacent side surface of the fuselage remote from the wing root, said concave arcuate shape being relatively sharp adjacent the forward edge of the fairing and becoming progressively shallower in the direction of the trailing edge of the wing.

9. A wing-fuselage fairing according to claim 8 wherein the concave-arcuate shape of its upper surface embodies substantially a one-quarter ellipse.

10. A wing-fuselage fairing according to claim 9 wherein the concave curved shaped of its upper surface is a one-quarter ellipse having its position of tangency to the wing out from the fuselage approximately three-quarters of the distance of its tangency with the fuselage above the wing.

11. A wing-fuselage fairing according to claim 8 wherein its trailing edge curves rearward from the trailing edge of the wing at a point spaced from the fuselage to the fuselage to define an obtuse angle therewith.

12. In an aircraft having a fuselage and a pair of wings joined to opposed sides thereof, an airfoil construction wherein the wings are inclined in an outward direction in diverging relation to each other and at an acute angle with respect to the sides of the fuselage, the top surface of said wings being faired into the adjacent sides of the fuselage along a concave arc, and said wings have a leading edge of rounded profile which from the tip of the wing progressively increases in radius for the major length thereof and then progressively decreases in radius to a minimum adjacent its joining the fuselage.

13. In an aircraft having a fuselage and a pair of wings joined to opposed sides thereof, an airfoil construction wherein the wings are inclined in an outward direction in diverging relation with respect to each other and at an acute angle with respect to the sides of the fuselage, and the said wings have a leading edge of rounded profile which, from a locus along said leading edge distant from the fuselage equal to roughly 10 to 30% of the wing root chord, diverges forwardly from the adjacent outboard portion of the leading edge of the wings, and the rounded profile of which leading edge progressively decreases in radius from said locus to the fuselage.

References Cited in the file of this patent

UNITED STATES PATENTS

| | | |
|---|---|---|
| 2,140,783 | Bellanca | Dec. 20, 1938 |
| 2,575,185 | Mulholland | Nov. 13, 1951 |

OTHER REFERENCES

"Plane Tips," Glenn L. Martin Co., July 3, 1945, 244–13.